Aug. 30, 1955  R. E. THOMPSON  2,716,368
SPEED GOVERNING DEVICE FOR MACHINE TOOLS
Filed Sept. 13, 1951
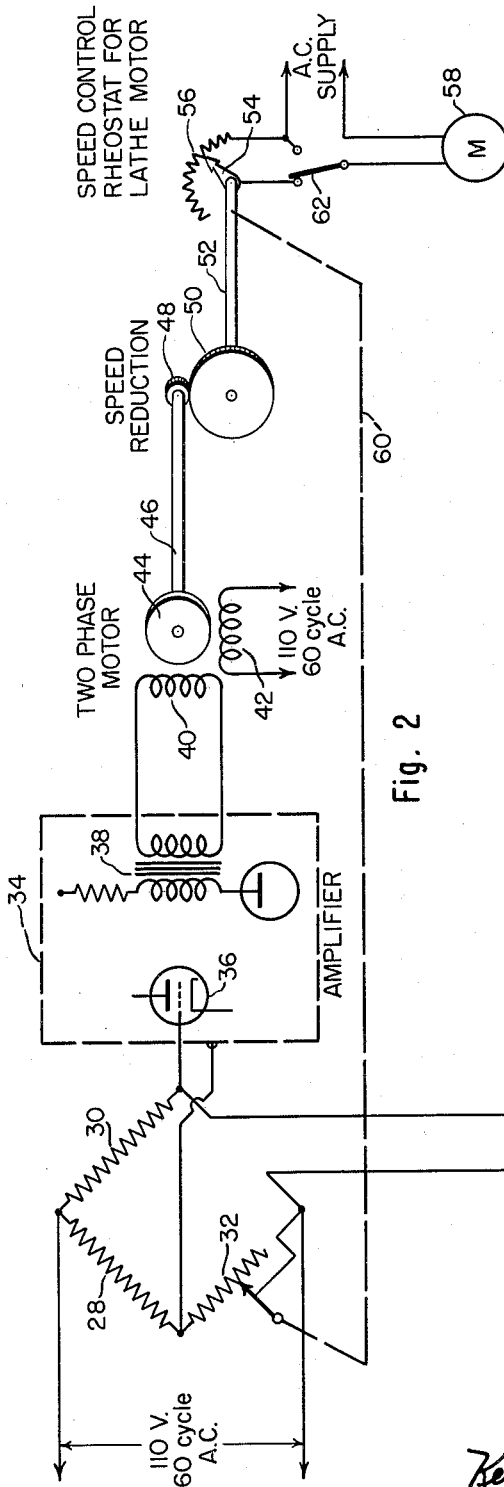
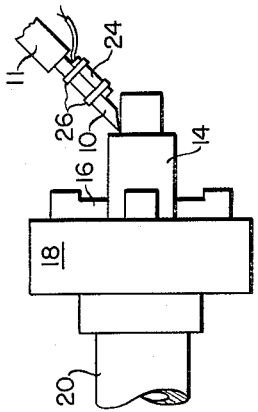
INVENTOR.
BY Ralph E. Thompson
Kenway, Jenney, Witter & Hildreth
Attys.

United States Patent Office 2,716,368
Patented Aug. 30, 1955

2,716,368

SPEED GOVERNING DEVICE FOR MACHINE TOOLS

Ralph E. Thompson, Brookline, Mass.; Ralph E. Thompson, Jr., and Lothrop Withington, executors of said Ralph E. Thompson, deceased Application September 13, 1951, Serial No. 246,353

4 Claims. (Cl. 82—1)

My invention relates to machine cutting tools of the type wherein a cutting instrument is held in contact with the work while the two are relatively moved.

In modern industry it is highly important that each machine be operated as closely as possible to maximum efficiency; in the case of machine cutting tools, such as a lathe, it is desirable to rotate the work at maximum speed without burning the cutting instrument. In view of the fact that the optimum speed varies during the progress of the work, due to progressive dulling of the tool and other factors, it has been the custom, in operating lathes, to rotate the work at a speed less than optimum in order to provide a safety margin. This practice, however, results in increasing the time required to perform a given operation and thereby adds to the labor cost of the item as well as decreasing the capacity of the machine tool.

Various schemes have been proposed for servo-control of lathes and similar tools, but the results have hitherto not been satisfactory on a practical basis because the devices which were promising from the standpoint of function proved too costly, while relatively inexpensive devices were not capable of satisfactory performance.

The primary object of my invention is to govern the speed of a lathe or similar tool automatically in response to the capacity of the cutting instrument from moment to moment during the cutting operation, and thereby to operate the tool at maximum efficiency. Another object of the invention is to increase the useful interval between the sharpening of a cutting tool and the time when it becomes necessary to resharpen it.

An important feature of the invention resides in a speed control circuit governing the speed of a lathe or similar tool, the control circuit including means responsive to the temperature of the cutting instrument for varying the relative speed between the instrument and the work.

Another feature of the invention resides in a speed control circuit as described in the preceding paragraph coupled with means for indicating to the operator that the cutting instrument requires resharpening.

These and other objects and features of my invention will be more readily understood and appreciated from the following detailed description of a preferred embodiment thereof selected for purposes of illustration and shown in the accompanying drawings wherein:

Fig. 1 is a diagrammatic view in side elevation showing a lathe tool operating on a piece of bar stock gripped in the jaws of a rotating chuck, the tool being equipped with a temperature responsive device, and Fig. 2 is a schematic circuit diagram of the speed control and governing circuit.

Before describing the illustrated embodiment in detail, it will be helpful to note that it includes in general a temperature responsive resistor clipped to the cutting tool of a lathe and also included as one leg of a bridge circuit. The output of the bridge circuit is amplified and supplied to one field of a two-phase motor, this field being energized in a direction determined by the phase of the current reaching it from the amplifier. The two-phase motor operates through speed reducing gears to actuate a rheostat included in the supply line serving the lathe motor. As the temperature of the cutting instrument varies, the resultant imbalance of the bridge about at calibrated zero position causes energization of the two-phase motor so that the rheostat is caused to increase or decrease the speed of the lathe motor, the change in speed being inversely related to the temperature of the cutting instrument.

As shown in Fig. 1 there is provided a lathe including a cutting tool 10 held in a conventional clamp 11 in position to operate upon a piece of bar stock 14 gripped in the jaws 16 of a conventional lathe chuck 18 which in turn is secured to a shaft 20. A temperature responsive resistor 24 of Nichrome or material having similar characteristics is secured to the lathe tool 10 by means of a pair of clips 26, the resistor 24 thus being maintained in intimate contact with the tool 10 and in heat exchange relation therewith.

Referring now to Fig. 2 it will be evident that the resistor 24 is included as one leg of a conventional Wheatstone bridge made up of a pair of conventional resistors 28 and 30 in opposition to the resistor 24 and to a potentiometer 32. The bridge is supplied with alternating current, conveniently at 110 volts and 60 cycles, and its output is connected to a conventional vacuum tube amplifier shown diagrammatically at 34, one of the leads from the bridge being connected to the grid of the tube 36 of the first stage of the amplifier, while the other lead from the bridge is connected to ground at the amplifier. The amplifier 34 preferably includes an output transformer 38, the secondary of which is connected across one field coil 40 of a two-phase motor including a second field coil 42 supplied with 60 cycle alternating current at 110 volts and with an armature 44 and a motor shaft 46. At the end of the motor shaft 46 there is fixed a small pinion 48 meshing with a large gear 50 whereby the speed of the shaft 46 is reduced. The gear 50 is mounted on a shaft 52 which in turn carries the movable contact element 54 of a rheostat 56. The rheostat 56 is connected in series with one side of a line utilized to supply the lathe motor 58 with alternating current. The shaft 52 is also connected to the movable member of the potentiometer 32, this being indicated in Fig. 2 by the line 60.

In operating the device as described above, the potentiometer 32 is set at a value such that the bridge circuit will be balanced when the resistor 24 reaches a temperature determined by calculation or experience to be the limit at which the lathe tool can operate without danger of burning when sharpened. For the start there is provided a two position switch 62 in the line leading to the lathe motor 58 so that the speed control can be cut out. The lathe motor is started and the tool 10 brought into contact with the stock, the usual arrangements being made for automatic feed. When the instrument 10 has operated against the stock 14 for a time sufficient to permit the temperature of the tool 10 to rise to its approximate normal operating temperature, the switch 62 is thrown to the position shown in Fig. 2, whereupon the speed control device takes command. If the temperature of the tool is then somewhat below optimum, the bridge circuit will be out of balance and will thereupon operate the two-phase motor through the amplifier 34 to cause the rheostat 56 to bring about an increase in the speed of the motor 58. Thereafter the temperature of the tool 10 will rise in response to the increased speed until the resistor 24 reaches optimum temperature. The bridge circuit will then be in balance and no current will reach the field coil 40. The speed of the motor will then remain substantially constant until such time as the temperature of the instrument 10 increases due to the fact that its edge has become duller or because the friction increases due to a non-uniformity of the stock, or for other reasons. The resultant increase in the temperature of the resistor 24 will cause imbalance of the bridge circuit in opposite direction; thereupon current will be supplied to the coil 40 in opposite phase to that during which the demand was for increased speed. Consequently the shaft 46 and the shaft 52 will be turned in the opposite direction to lower the voltage supplied to the motor 58. As the speed is thus reduced the temperature of the tool 10 and the resistor 24 will correspondingly decrease until the bridge circuit is again in balance.

It will be noted that during these changes the potentiometer 32 is also varied through its mechanical connection through the shaft 52. This feature of the invention is employed to prevent wide swings and overruns. That is to say, as the shaft 52 moves to increase or decrease the speed of the lathe motor, the potentiometer 32 is actuated to lessen the imbalance of the bridge circuit and thereby introduce an appreviated response in order to compensate for the lag between the increase or decrease of speed of the stock 14 and the resultant change in the temperature of the cutting instrument 10 and its associated resistor 24. Therefore, the possibility of "hunting" is minimized.

While I have here described one embodiment of the invention which has been operated with highly successful results, it is to be understood that the invention is by no means limited to the precise arrangement shown. The essence of the invention consists in governing the speed of the motor of a machine tool including a cutting instrument in response to the temperature of the instrument, or, to put it another way, the speed of the tool is governed by the heat developed in the cutting instrument as it performs its function. There are obvious alternatives by means of which the same or similar results can be obtained, although the arrangement here described in detail is the best mode now known to me for the practice of the invention.

I claim:

1. A device for governing the speed of a machine tool including a cutting instrument, means for holding work, and a motor arranged to produce relative motion between the work and the cutting instrument; comprising a heat-sensitive resistor secured to said instrument in heat exchange relation therewith, a bridge circuit including said resistor, means for balancing said bridge circuit, an amplifier connected to said bridge circuit, a reversible motor controlled by said amplifier, and a rheostat controlling said balancing means and controlling current to said first motor, said rheostat being driven by said reversible motor, thereby automatically varying the speed of said first motor with the temperature of said instrument to maintain the instrument temperature within a given range.

2. A device for governing the speed of a machine tool including a cutting instrument, means for holding work, and a motor arranged to produce relative motion between the work and the cutting instrument; comprising a heat-sensitive resistor secured to said instrument in heat exchange relation therewith, a bridge circuit including said resistor, means for balancing said bridge circuit, an amplifier connected to said bridge circuit, a reversible motor controlled by said amplifier, a rheostat controlling said balancing means, and a mechanical connection between said reversible motor and said balancing means so arranged that actuation of the rheostat in one direction is accompanied by balancing of the bridge circuit in the opposite direction to limit the travel of the rheostat, whereby the heat generated in the cutting instrument as it cuts the work is employed to control the speed of the motor in inverse relation to the temperature of said instrument to maintain the temperature of said instrument within a predetermined range.

3. A machine tool comprising a cutting instrument, means for holding work in operative association with said instrument, a driving motor arranged to produce relative motion between the work and the cutting instrument, means to vary the speed of said motor, and a device for automatically governing the speed of said motor; said device comprising an element whose electrical value varies with its temperature secured in heat exchange relationship with said cutting instrument, a signal generating circuit in circuit with and controlled by said element and means connected in circuit with said signal generating circuit and said speed varying means to operate said driving motor at a varying speed whenever the electrical value of said element departs from a predetermined value, to cause the speed of the driving motor to vary in inverse relation to the temperature of the cutting instrument to maintain the temperature of the instrument within a predetermined range.

4. A machine tool comprising a cutting instrument, means for holding work in operative association with said instrument, a driving motor arranged to produce relative motion between the work and the cutting instrument, a supply line to said motor, and a device for automatically governing the speed of said motor; said device comprising a rheostat connected in the supply line to said driving motor for controlling the speed thereof, a reversible motor for operating said rheostat, an element whose electrical value varies with its temperature secured in heat exchange relationship with said cutting instrument, a signal generating circuit controlled by said element and connected to operate said reversible motor whenever the electrical value of said element departs from a predetermined value, the operation of the reversible motor causing the rheostat to vary the speed of the driving motor in inverse relation to the temperature of the cutting instrument to maintain the temperature of the instrument within a predetermined range.

References Cited in the file of this patent

UNITED STATES PATENTS

| | | |
|---|---|---|
| 2,025,144 | Allen | Dec. 24, 1935 |
| 2,089,014 | Bucknam et al. | Aug. 3, 1937 |
| 2,228,902 | Allen | Jan. 14, 1941 |
| 2,255,094 | Aeppli | Sept. 9, 1941 |
| 2,303,110 | Cockrell | Nov. 24, 1942 |
| 2,426,711 | Shaffer | Sept. 2, 1947 |
| 2,427,064 | Moul | Sept. 9, 1947 |
| 2,498,881 | Eldridge | Feb. 28, 1950 |